Feb. 6, 1940. H. A. RAPHAEL 2,189,552
WEIGHT RECORDER
Filed Oct. 13, 1937 2 Sheets-Sheet 1
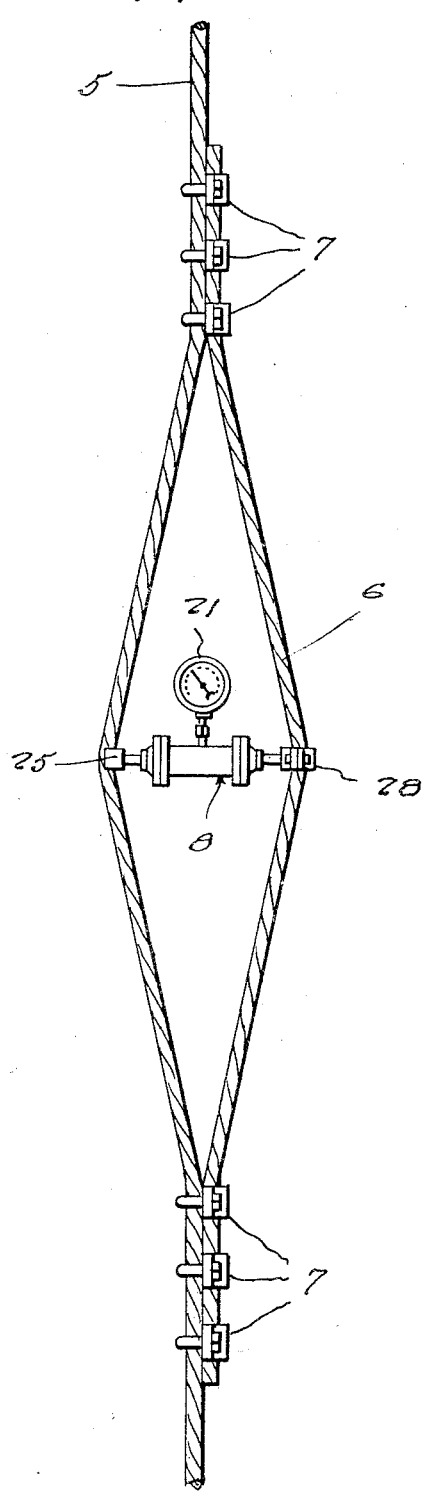
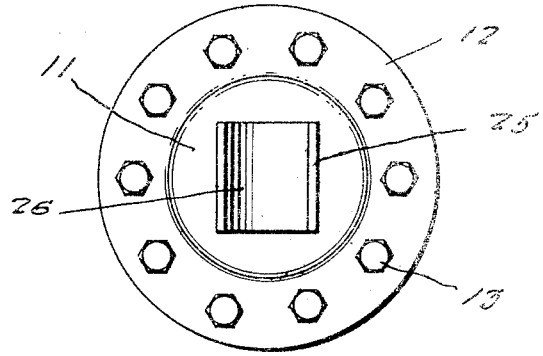
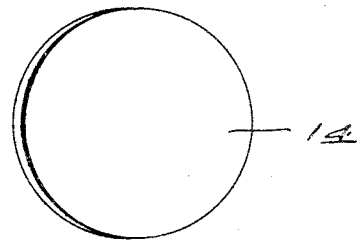
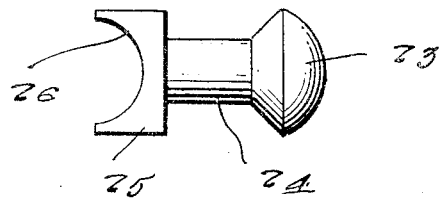
Inventor
Harold A. Raphael
By Clarence A. O'Brien
Hyman Berman
Attorneys Feb. 6, 1940.     H. A. RAPHAEL     2,189,552
WEIGHT RECORDER
Filed Oct. 13, 1937     2 Sheets-Sheet 2
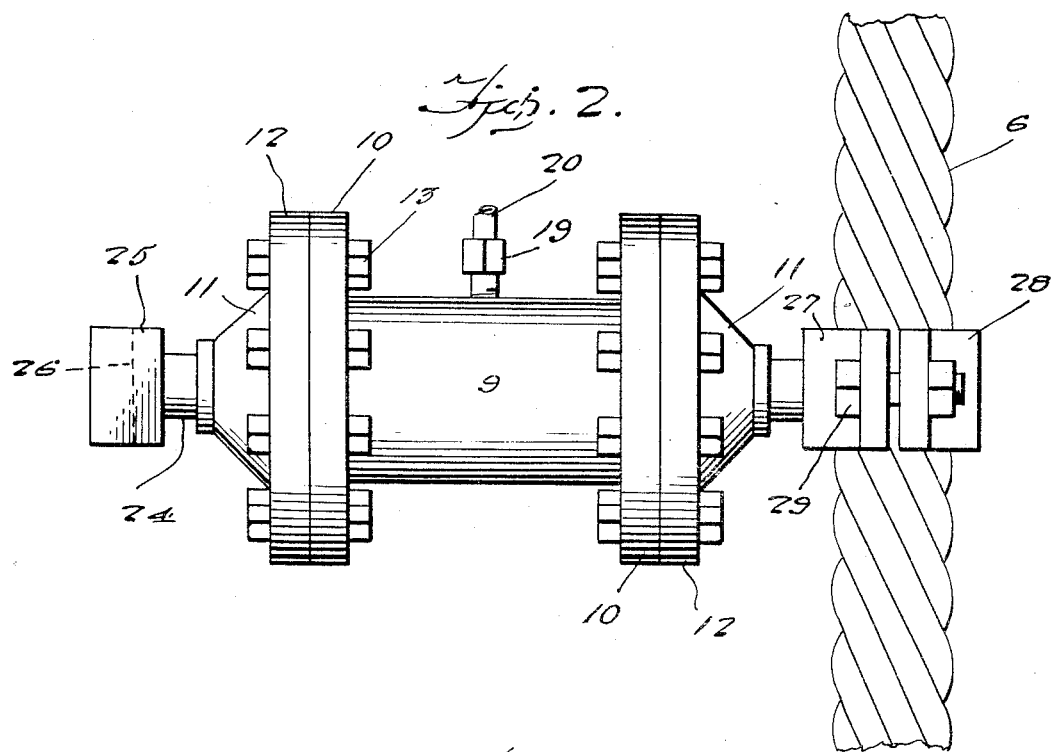
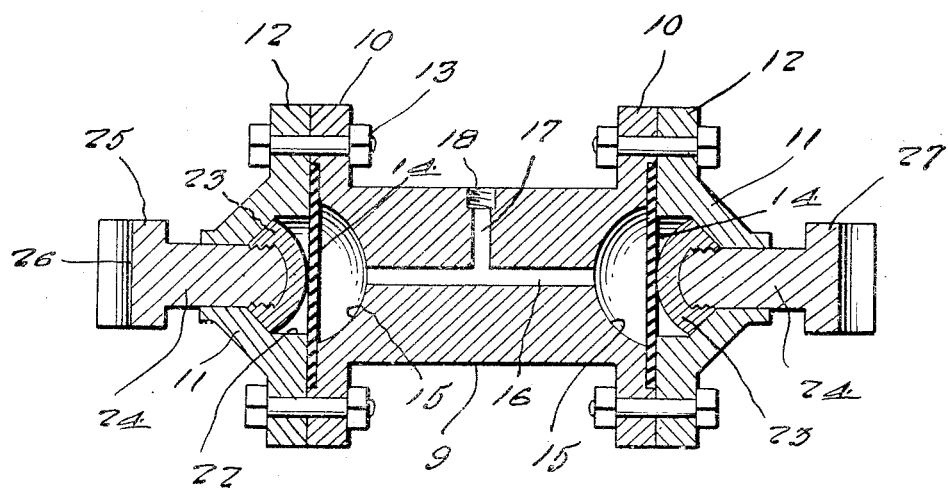
*Inventor*
Harold A. Raphael
By Clarence A. O'Brien
Hyman Berman
*Attorneys*

Patented Feb. 6, 1940

2,189,552

UNITED STATES PATENT OFFICE 2,189,552

WEIGHT RECORDER

Harold A. Raphael, Bellflower, Calif.

Application October 13, 1937, Serial No. 168,814

6 Claims. (Cl. 265—1.6)

This invention relates to weight recorders and more particularly to a double action hydraulic weight recorder for use in determining the amount of weight or strain on a cable, and particularly for determining the load on the tool-carrying cable of well drilling apparatus.

The invention consists in a novel combination, arrangement and construction of parts; and the invention together with its objects and advantages will be best understood from a study of the following description taken in connection with the accompanying drawings wherein:

Figure 1 is a view illustrating the application of the invention.

Figure 2 is an elevational view of the device per se.

Figure 3 is a longitudinal sectional view through a hydraulic cylinder and piston arrangement.

Figure 4 is an end elevational view of the hydraulic cylinder and piston arrangement.

Figure 5 is a perspective view of a diaphragm disk.

Figure 6 is an elevational view of a piston and cable engaging head assembly.

Referring to the drawings by reference numerals it will be seen that 5 indicates a portion of a length of a load-carrying cable, such as a cable used as a part of well drilling apparatus for suspending the drilling tool, and as set out in the statement of the invention the present invention is particularly designed for determining the amount of weight or strain on the load-carrying cable 5.

To this end the invention comprises a suitable length 6 of cable which at its respective opposite ends is clamped to the cable 5 at spaced points in the length of the cable 5 through the medium of suitable clamps 7—7.

Interposed between the cables 5 and 6 intermediate the points of connection 7 is an hydraulic piston and cylinder assembly indicated generally by the reference numeral 8.

The assembly 8 comprises a cylinder 9 which at its opposite ends is flanged as at 10. For said ends of the cylinder 9 are caps 11 provided with flanges 12 through the medium of which, and bolts 13 the caps 11 are secured to the flanged ends of the cylinder 9.

Clamped between each set of flanges 10—12 is a diaphragm 14 in the form of a rubber disk. At each flanged end thereof the cylinder 9 is hollowed out to provide at one side of the adjacent diaphragm 14 a fluid chamber 15 and the chambers 15 are connected by a fluid passage 16 that extends axially of the cylinder 9. Leading from the passage 16 intermediate the ends of the latter is a lateral passage 17, and at the end of the passage 17 the cylinder 9 in the periphery thereof is suitably provided as at 18 to accommodate a nipple 19.

The nipple 19 is connected through the medium of any suitable conduit 20 with a conventional hydraulic gauge 21.

The gauge 21 while shown closely positioned relative to the assembly 8 may, it is understood, in actual practice, be located as remote from the assembly 8 as found desirable.

Each cap 11 is also hollowed out to provide a piston chamber 22 that accommodates a piston 23 threaded on one end of a stem 24 that works through a suitable opening provided therefor in the crown of the cap 11.

The stem 24 of one of the pistons is provided with a cable engaging head 25 that is provided with a concave face 26 to seat against, in the present instance, the cable 5.

The stem 24 of the other piston 23 is provided at its free end with a fixed clamp member 27 for which there is provided a complemental cap 28, and clamp member 27 and its cap 28 are provided with apertured lugs through the medium of which and bolts 29 the complemental clamp elements 27 and 28 serve to positively secure the assembly 8 to the cable 6 intermediate the ends of the latter.

It will thus be seen that with the assembly 8 interposed between the cables 5 and 6 said cables will be spread apart, and normally the diaphragms 14 are in the position shown in Figure 3.

It will be apparent that in practice the assembly 8 causing a spread between the cables 5 and 6 will result in one-half of the load being carried by cable 5 and the other half of the load by cable 6. Obviously then when pressure is exerted by the load on the main cable the portions of the cables 5 and 6 between the points 7 will tend to move toward one another against the action of the fluid within the cylinder 9. This will cause the pistons 23 to move inwardly for flexing the diaphragms 14 inwardly of the chambers 15. This flexing of the diaphragms will cause the fluid to flow through the passages 16 and 17 and the conduit 20 to the gauge 21 for operating the latter. Consequently one by reading the gauge 21 may ascertain the amount of strain or weight on the cable 5.

Thus it will be seen that I have provided a device where the amount of strain or weight on the work cable of a well drilling apparatus, or on any load carrying cable may be accurately indicated.

It is thought that a clear understanding of the construction, operation and utility of an invention of this character will be had without a more detailed description.

Having thus described the invention, what is claimed as new is:

1. For use in conjunction with a load-carrying cable and a hydraulic gauge for indicating the weight of the load on the cable, a cable section of suitable length secured at its respective opposite ends to the load-carrying cable at spaced points on the load-carrying cable and an hydraulic spread device interposed between the load-carrying cable and said cable section intermediate said points of connection between the cable section and the load-carrying cable, said hydraulic device including a cylinder containing fluid and provided with means for connecting the cylinder with the gauge for conducting fluid under pressure from the cylinder to the gauge, and pressure responsive means within said cylinder and connected with said cable and cable section for acting on the fluid within the cylinder to force the same under pressure to said gauge in response to the pressure exerted by the load on said load-carrying cable.

2. The combination with a load carrying cable, of means to indicate the load thereon including a short cable having its opposite ends fixed to the load carrying cable in spaced apart relation, a cylinder having a pair of fluid containing chambers in its opposite ends, respectively, and an axial bore therein establishing communication between said chambers, a fluid pressure gauge communicating with said bore, a pair of flexible diaphragms on opposite ends of said cylinder, respectively, closing the outer ends of said chambers, a pair of pistons mounted on opposite ends of the cylinder for movement inwardly against said diaphragms, respectively, under pressure exerted thereagainst, and means on said pistons for location between said load carrying and short cables and engagement with the cables respectively.

3. The combination with a load carrying cable, of means to indicate the load thereon including a short cable having its opposite ends fixed to the load carrying cable in spaced apart relation, a cylinder having a pair of fluid containing chambers in its opposite ends, respectively, and an axial bore therein establishing communication between said chambers, a fluid pressure gauge communicating with said bore, cap members on the opposite ends of said cylinders, a pair of flexible diaphragms interposed between said cap members and ends of the cylinder, a pair of pistons in said cap members, respectively, movable inwardly against said diaphragms under pressure exerted thereagainst, and stems on said pistons projecting outwardly of said cap members to be interposed between said load carrying and short cables and having means on their outer ends for engaging said cables, respectively, one of said cable engaging means including a clamp for attachment to the related cable.

4. A device for use in connection with a load-carrying cable and an hydraulic gauge for indicating the weight of the load on said cable, said device comprising a cable section of suitable length adapted to be secured at its respective opposite ends to the load-carrying cable at spaced points on the latter, a cylinder provided at relatively opposite ends thereof with fluid accommodating chambers and also with a longitudinal passage connecting said chambers and a lateral branch for said passage opening through the periphery of said cylinder, caps secured to said cylinder at the opposite ends of the latter, diaphragms clamped in position at the opposite ends of said cylinder between said ends of the cylinder and said caps, said caps being hollow, and pistons accommodated within the hollows of said caps to bear on said diaphragms at one side of the latter, said pistons having stems working through said caps, and said piston stems having at the outer ends thereof heads for engaging the load-carrying cable and said cable section respectively.

5. An assembly for attachment to a load carrying cable at any desired position along its length for measuring the load on said load carrying cable comprising a predetermined length of a second cable adapted to be secured to said load carrying cable along any selected portion thereof, means for securing said second cable to said load carrying cable at spaced points along said selected portion to thereby provide two cables at the desired position without interrupting the continuity of said load carrying cable, a hydraulic gauge operating device interposed between and maintaining said two cables apart, said gauge operating device communicating with a hydraulic gauge and being operative under compression forces exerted thereagainst by said cables in response to a load on said load carrying cable to operate said hydraulic gauge to indicate the magnitude of said load.

6. An assembly for attachment to a load carrying cable at any desired position along its length for measuring the load on said load carrying cable comprising a predetermined length of a second cable adapted to be secured to said load carrying cable along any selected portion thereof, means for securing said second cable to said load carrying cable at spaced points along said selected portion to thereby provide two cables at the desired position without interrupting the continuity of said load carrying cable, a hydraulic gauge, a hydraulic unit interposed between said load carrying cable and said second cable, said hydraulic unit having a fluid containing chamber and means for connecting said chamber with said hydraulic gauge for conducting fluid pressure from said chamber to said gauge, a flexible diaphragm forming a wall of said chamber and means secured to one of said cables and operative to depress said diaphragm to thereby operate said hydraulic gauge in response to a load on said load carrying cable.

HAROLD A. RAPHAEL.